(12) United States Patent
Lortz (10) Patent No.: US 6,349,410 B1
(45) Date of Patent: Feb. 19, 2002

(54) INTEGRATING BROADCAST TELEVISION PAUSE AND WEB BROWSING

(75) Inventor: Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/368,211

(22) Filed: Aug. 4, 1999

(51) Int. Cl.[7] .............................................. H04N 7/173
(52) U.S. Cl. ........................ 725/110; 725/112; 725/134
(58) Field of Search ................................ 725/109, 110, 725/112, 113, 134, 142

(56) References Cited

U.S. PATENT DOCUMENTS

| | | | | |
|---|---|---|---|---|
| 5,371,551 A | * | 12/1994 | Logan et al. | 348/571 |
| 5,761,606 A | * | 6/1998 | Wolzien | 725/110 |
| 5,774,664 A | * | 6/1998 | Hidary et al. | 725/110 |
| 5,778,181 A | * | 7/1998 | Hidary et al. | 725/110 |
| 5,818,441 A | * | 10/1998 | Throckmorton et al. | 345/328 |
| 5,987,509 A | * | 11/1999 | Portuesi | 725/113 |

FOREIGN PATENT DOCUMENTS

| | | |
|---|---|---|
| WO | 98/17064 | 4/1998 |
| WO | 98/48566 | 10/1998 |
| WO | 99/34599 | 7/1999 |

* cited by examiner

*Primary Examiner*—John W. Miller
(74) *Attorney, Agent, or Firm*—Steven P. Skabrat (57) ABSTRACT

Coordination of the display of an incoming signal stream (such as broadcast TV content or streaming web content) on a display with web browsing. The method includes storing a uniform resource locator (URL) associated with the incoming signal stream being displayed, receiving a first signal to display web content associated with the URL, pausing display of the incoming signal stream while storing the incoming signal stream on a storage device, and obtaining and displaying the web content associated with the URL. The method further includes receiving a second signal to resume display of the incoming signal stream, removing the web content from the display, and resuming display of the incoming signal stream at the point that the pause occurred by obtaining the incoming signal stream from the storage device.

33 Claims, 4 Drawing Sheets

INTEGRATING BROADCAST TELEVISION PAUSE AND WEB BROWSING

BACKGROUND

1. Field

The present invention relates generally to computer systems and consumer electronics and, more specifically, to integration of computer and television features.

2. Description

New forms of consumer electronics products are continually being developed and marketed. Many development efforts have been focused on the convergence of computer technology and home entertainment systems that center on the television (TV) set. Specifically, broadcast television recording and playback devices have been developed based on personal computer (PC) industry components. These devices are used to receive and record broadcast television signals. The received signals are stored in digital form on a conventional hard disk rather than on an analog video tape. The data may be rendered on a display (such as a television set or computer monitor) for a user at the same time that the data is being received and stored in the device. These devices are commercially available from companies such as Replay Networks, Inc. of Mountain View, Calif., and TiVo, Inc. of Sunnyvale, Calif., for example.

One feature of these devices is the ability to pause the display of the broadcast television program and then resume the display at a later point in time without missing any of the program. This "broadcast pause" feature is made possible by the use of a random access storage device (e.g., a hard disk or writeable optical disk) that continuously records incoming broadcast television signals as they are being received and displayed. When the user pauses the real-time rendering of the program, the program data continues to be streamed to the storage device for later playback. When the user resumes display of the program, the previously recorded program data is obtained from the storage device and rendered on the display as the new incoming program data continues to be recorded by the device. Due to the linear nature of magnetic tape media, conventional video cassette recorders (VCRs) are unable to provide this feature.

Although useful for allowing a user to pause, restart, and archive broadcast TV content, these devices do not include the ability to obtain and navigate world wide web (WWW) content available over networks such as the Internet.

Another avenue for the convergence of computer technology and home entertainment systems is interactive television. One well-known model for interactive TV is that of a merged broadcast TV/Internet experience whereby WWW uniform resource locators (URLs) are simulcast with TV signals. This may be accomplished by inserting the URLs into the vertical blanking interval (VBI) of a broadcast TV signal or in a separate data channel of a digital TV video stream. When prompted by a message in the TV broadcast, the user may select one or more of the URLs to contact a web site over the Internet and perform a transaction or obtain additional information relating to the broadcast.

With current technology, retrieved web content is displayed in parallel to the broadcast picture either on a separate device (using a separate computer monitor or web browser appliance) or on the TV screen (using "picture-in-picture" or some other windowing technology). One drawback of these conventional alternatives is that they force the user to either split his or her attention between the TV and the web browser or simply miss part of the ongoing TV program while he or she is examining the web content. In the case of a separate browser device, the user has to purchase such a device (incurring the high cost of a separate display in addition to the TV) and tolerate the clutter and distraction of two display devices in the same room. In the case of using the TV display, the user cannot continue to watch the complete TV program while he or she is also looking at web content. These disadvantages may deter the widespread adoption of such technologies and a method of overcoming these and other problems would be advantageous.

SUMMARY

An embodiment of the present invention is a method of coordinating the display of an incoming signal stream on a display with web browsing. The method includes storing a uniform resource locator (URL) associated with the incoming signal stream being displayed, receiving a first signal to display web content associated with the URL, pausing display of the incoming signal stream while storing the incoming signal stream on a storage device, and obtaining and displaying the web content associated with the URL.

Other embodiments are described and claimed.

BRIEF DESCRIPTION OF THE DRAWINGS

The features and advantages of the present invention will become apparent from the following detailed description of the present invention in which.

DETAILED DESCRIPTION

An embodiment of the present invention comprises an intuitive user interface for the integration of broadcast television and web content.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
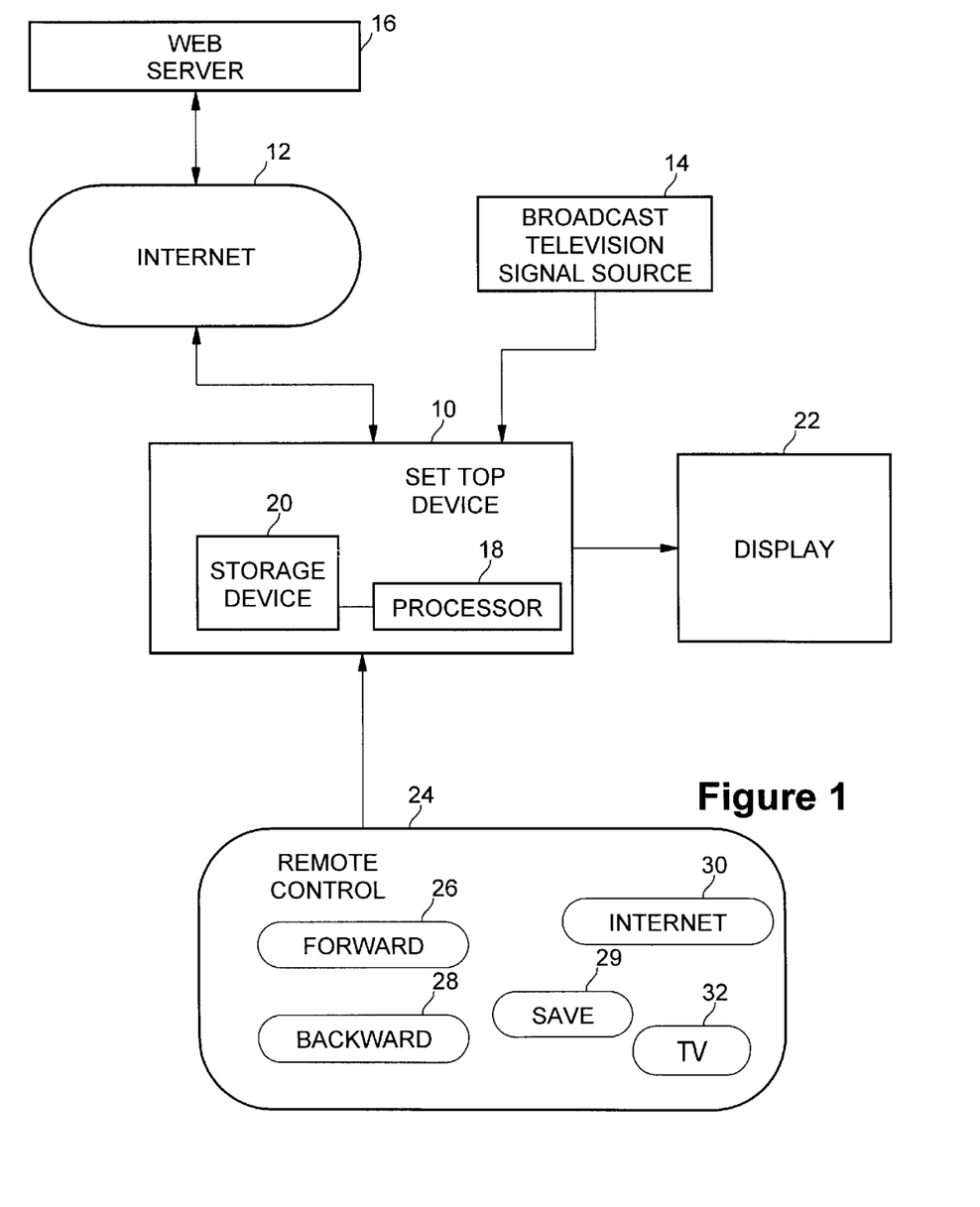
FIG. 1 is a system for integrating broadcast television pause and web browsing according to an embodiment of the present invention.

In response to the limitations of current broadcast TV/web browsing approaches, an embodiment of the present invention combines the broadcast TV pause feature with the simulcast of URLs. In one embodiment, a set top device may combine the functionality of a general purpose computer system with that of a broadcast TV pause/replay device and a cable TV set-top box. FIG. 1 is a system for integrating broadcast television pause and web browsing according to an embodiment of the present invention. A set top device 10 may be coupled to a network such as the Internet 12 and also to a broadcast television signal source 14. Web content may be received from the Internet from a Web server 16 as is well-known in the art. In one embodiment, the web content comprises relatively "static" web pages containing text and images. In another embodiment, the web content comprises "streaming" audio and video being delivered in real-time to the set top device. TV content may be received from the broadcast TV signal source through any one of several well-known methods such as "over-the-air" antennas, satellites, cables, and the like. The TV content may be in analog or digital form.

The set top device includes a processor 18 to execute programming instructions for operating the set top device to receive, store, pause, and render web content and TV content. The programming instructions may also include a web browser program. The set top device also includes storage device 20 to store both broadcast TV content and web content in digital form. If the broadcast TV content is received in digital form, it may be stored directly in the storage device. If the broadcast TV content is received in analog form, it may be converted to digital form, compressed, and stored in the storage device for future or contemporaneous rendering on display 22. Display 22 is used to render both web content and broadcast TV content.

A remote control 24 is included in the system to communicate user selections to the set top device via a well-known wireless technology such as infrared (IR). In one embodiment of the present invention, the remote control includes various special user input buttons such as forward 26, backward 28, save 29, Internet 30, and TV 32, to be discussed in further detail below.

Figure 2:
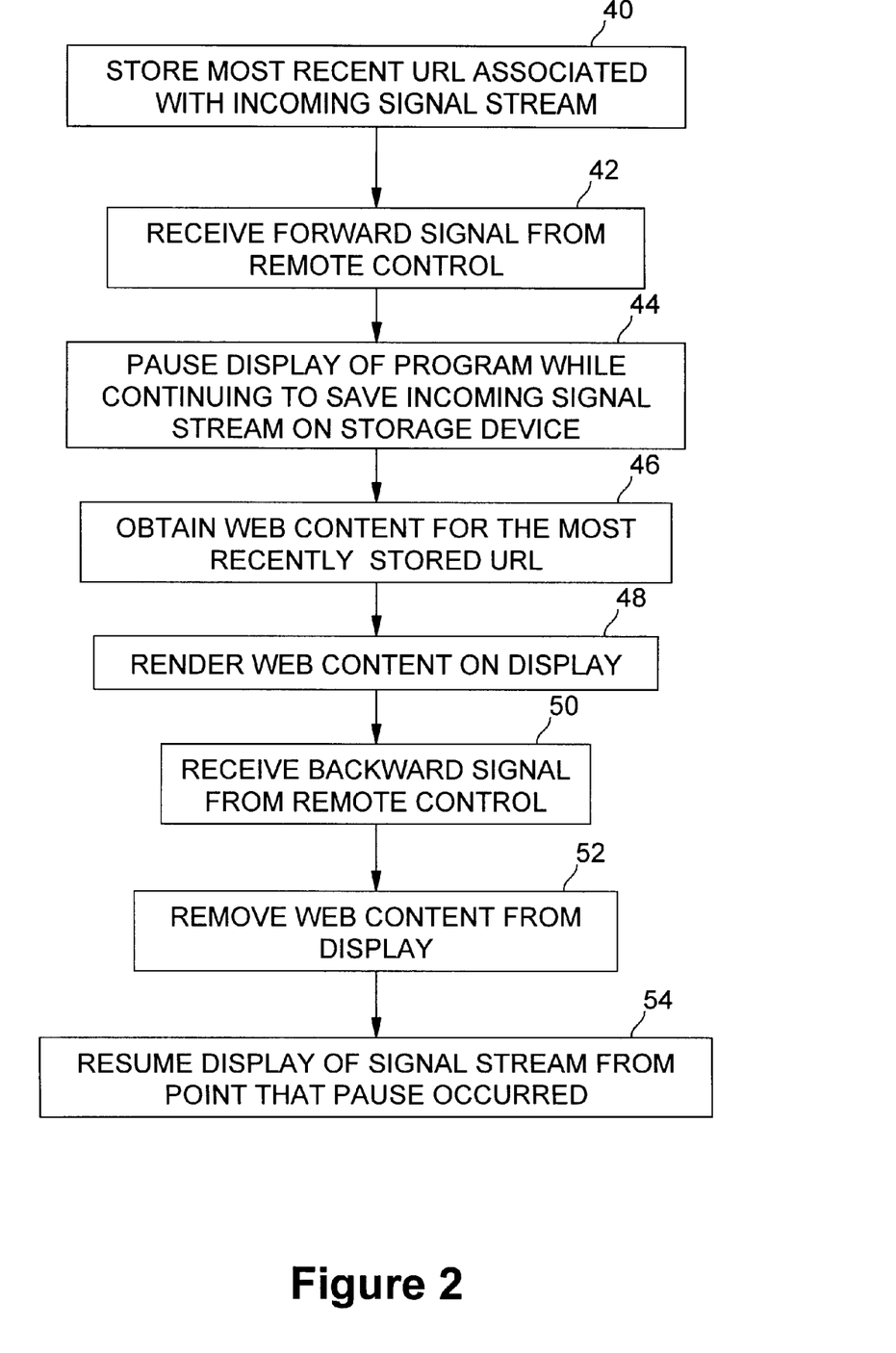
FIG. 2 is a flow diagram illustrating the integration of broadcast television pause and web browsing according to an embodiment of the present invention.

The system shown in FIG. 1 may be employed as follows. FIG. 2 is a flow diagram illustrating the integration of broadcast television pause and web browsing according to an embodiment of the present invention. Prior to system operation, URLs linking web content to broadcast TV content may be inserted into the broadcast TV signal stream by a broadcaster or other provider of TV programming or signals. This information may be inserted into the VBI of an analog signal stream, into a data channel within a digital signal stream, or by way of any other mechanism for communicating the URL along with the signal stream. The signal stream may be received by the set top device from the broadcast TV signal source. Alternatively, streaming audio and video from a web server over the Internet or other network may be used as the "live" signal stream. This signal stream may include embedded URLs to other web pages. As the signal stream is being received, the signal stream may be rendered to the display and/or stored on the storage device of the set top device.

At block 40, the set top device stores the most recent URL associated with an incoming signal stream. The user at this point may be watching either the broadcast TV signal stream or the streaming audio and video web content on the display. When the user wants to access web content referenced by the most recent URL, the user in one embodiment presses the forward button 26 on the remote control. At block 42, the set top device receives the forward signal from the remote control. This causes the set top device to pause the display of the signal stream currently being received at block 44, while continuing to save the incoming signal stream on the storage device. The set top device then obtains the web content for the most recently stored URL from the appropriate web server at block 46. During the web page loading time, the display either shows the partial web page being built or it continues to show a "freeze-frame" of the incoming signal stream (either TV broadcast or Internet streaming audio and video) at the time of the pause.

Once the web content is available, the entire display screen may be used to render the web content at block 48. The web content may then be navigated by using the forward button 26 to go to other links. The backward button 28 may be used to go back to a previous web page in a web page history list. The forward and backward buttons serve a dual purpose. They control the switch of context from the TV or streaming Internet broadcast to "static" web content, and they also traverse the web page history list. When the current web page is the first page in the history list and the backward button is pressed by the user, in one embodiment the web content may be removed from the display and the paused TV or streaming Internet broadcast may be resumed. Thus, at block 50, the backward signal may be received by the set top device from the remote control, and at block 52, the set top device removes the web content from the display. At block 54, the display of the signal stream may be resumed from the point that the pause occurred. The data for this display may be retrieved from the storage device.

To indicate availability of a related web URL during the broadcast, a visual cue, such as a transparent overlay icon, may be provided in the incoming signal stream. This icon may be displayed on the display to notify the user that web content associated with the current broadcast may be viewed when the main broadcast is paused. In one embodiment, the URL may have an associated expiration time. For example, the URL may be valid for only 10 seconds, at which time another URL would replace the current one or the set top device would simply remove the URL from storage as the "most recent" URL. If there is no currently valid URL associated with the broadcast, the set top device may not respond to a forward button selection. With such features, TV broadcasters may modify their advertising business model to include "URL" time as well as commercial time.

To facilitate web browsing with a remote control, it would be advantageous in one embodiment of the present invention if the web pages reached through the simulcast URLs were designed to publish a "forward destination" URL. This URL would be used when the user presses the forward button. This forward destination URL may be transmitted from the web server 16 to a browser program executing on the set-top device using a new type of XML-based tag in the web page. This "prime the forward button" tag provides the browser with a URL to use if the web page history list maintained by the set top device does not currently include a value for the forward browsing button. This may be useful in the context of browsing a series of web pages using a simple handheld remote control 24. The user may simply press the same forward button 26 to read additional web content and then press the backward button 28 the same number of times to return to the broadcast program.

Additionally, in one embodiment, an Internet button 30 and a TV button 32 may be included in the remote control. When the user has paused the broadcast and is reading web content on the display, the user may go directly back to the display of the broadcast by pressing TV button 32. Conversely, when the broadcast is being displayed and the user desires to go to the currently available URL, the user may press Internet button 30. Note that the initial selection of the forward button 26 would also select the display of web content.

One difficulty encountered in embodiments of the present invention is knowing when to save the incoming live signal stream (whether broadcast TV content or streaming web content) and how much to save when the user is interactively "surfing" through various TV programs and web pages. In one embodiment, if the user is watching broadcast TV, it may be assumed that the user intends to return to the TV program after the user is finished looking at a related web page. However, if the user is channel surfing or web page surfing, all visited content may not be saved for future viewing. Hence, a set of rules may be employed to determine when set top device 10 should save live content.

If the user activates forward button 26 to go to the currently active URL, the set top device may begin saving the current incoming signal stream. If save button 29 is activated, then the set top device starts saving the currently displayed signal stream on the storage device. The user may or may not choose to "surf" away at that point. In one embodiment, the user may not be limited to selecting the currently active destination URL. In this embodiment, the user may select another URL that may be inputted to the system by an input device such as a keyboard (not shown) or is "hard-wired" to another dedicated button on the remote control. The save broadcast feature may be operated on either broadcast TV content or streaming web content.

If the user has been watching a broadcast program for a user-configurable length of time, the system may infer that the user is interested in the program and therefore by default may save the program's content on the storage device if the user either switches channels or begins to surf the web. This allows the user to avoid having to remember to press the save button for a program that the user has been watching for a while before leaving the display of the program for a web page. At the same time, the system may detect and ignore channel surfing by virtue of how briefly the user watches each channel. In another embodiment, the system may apply knowledge of TV viewing history (and/or TV program recording history) to automatically determine if a program is of sufficient interest to warrant automatic saving when the user switches the current focus to other data (such as a web page).

Since the save button has not been pushed, however, the system may, in one embodiment, reduce its internal estimation of the value of the saved data below any other data that it had been explicitly direct to save. When the storage device becomes full, the system may overwrite the automatically saved data first.

Figure 3:
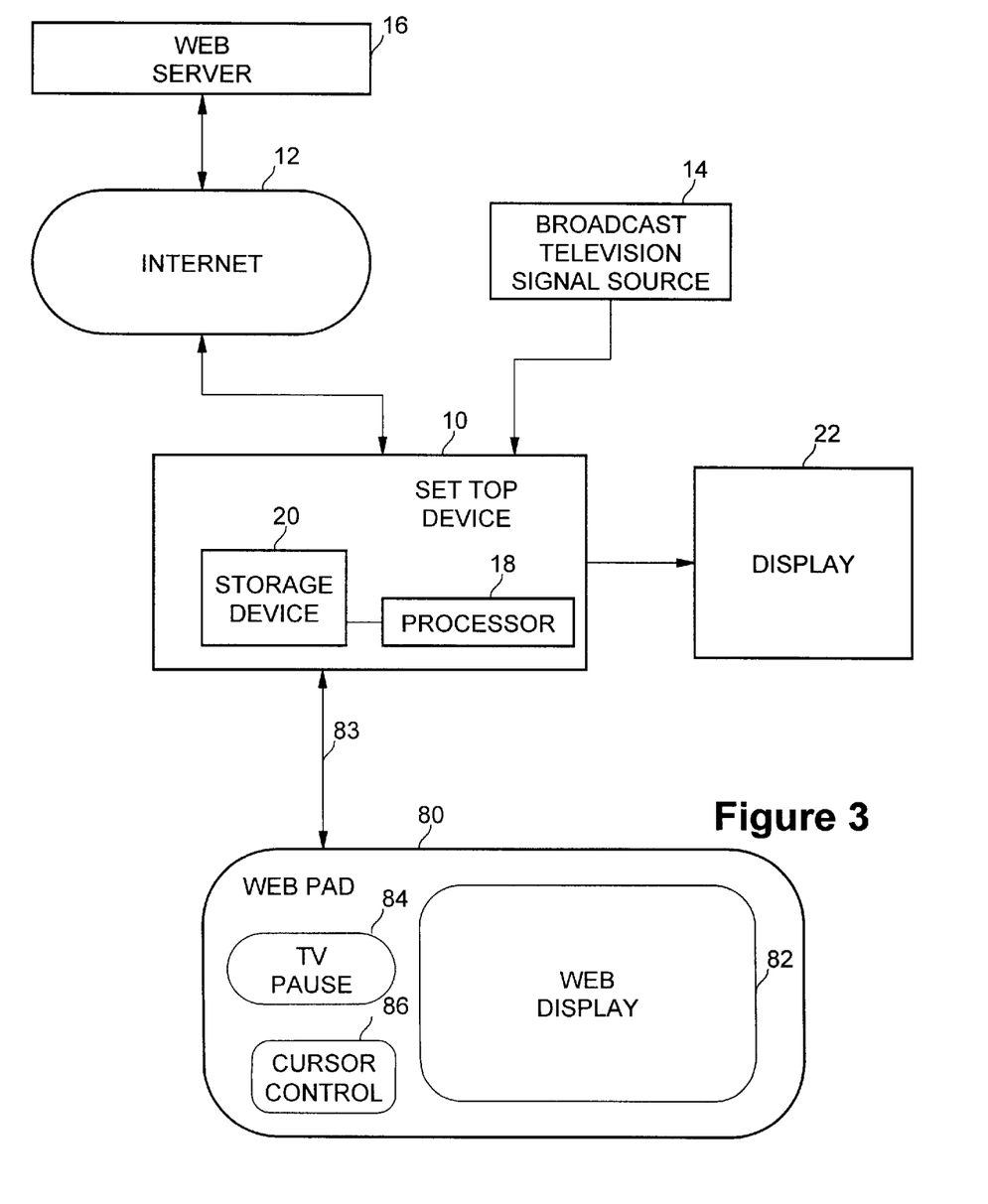
FIG. 3 is a system for integrating broadcast television pause and web browsing according to another embodiment of the present invention.
Figure 4:
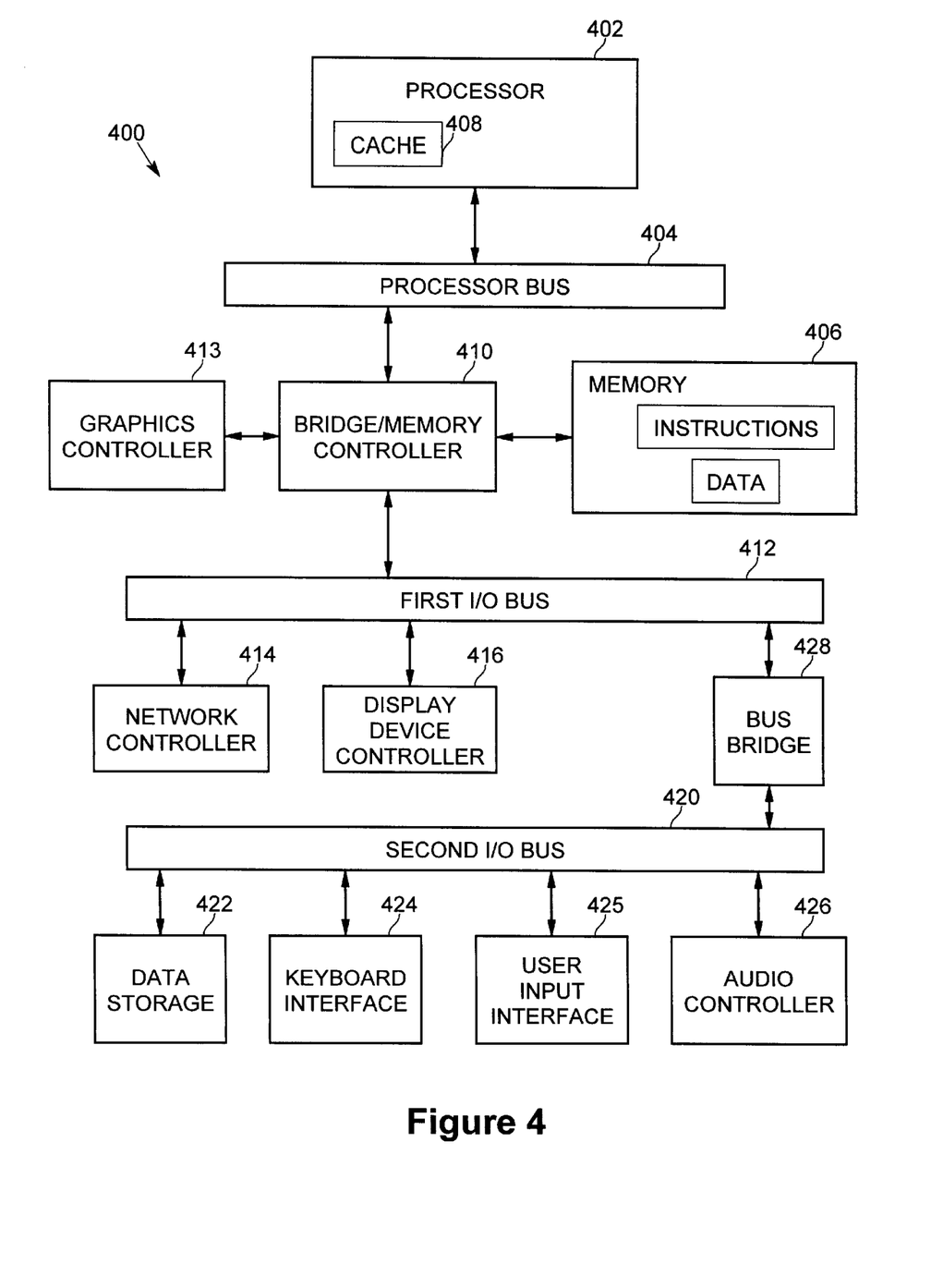
FIG. 4 is a diagram illustrating a sample processing system capable of being operated according to an embodiment of a method of integrating broadcast television pause and web browsing in accordance with the present invention.

In another embodiment of the present invention, a web pad may be provided to coordinate viewing of TV content and web content. FIG. 3 is a system for integrating broadcast television pause and web browsing according to this embodiment. A web pad 80 is a hand held portable computing appliance that provides a separate user interface (UI) screen (e.g., web display 82) for viewing web content. The web pad may include one or more user input indicators such as buttons or a touch screen. URLs received by set top device 10 within the TV content may be transmitted to the web pad via a bi-directional radio frequency (RF) link 83. The web pad may be used to obtain and display the web content from the received URLs. The web content specified by these URLs may be received via the set top device 10 or through another communications channel to web pad 80, such as a separate cellular telephone/modem connection to the Internet, or a RF-based home network which is coupled to the Internet, for example. Web pad 80 includes a TV pause button 84 that can, when depressed, direct the set top device to pause the incoming signal stream and save it on the storage device (so the user doesn't miss the show while the user's attention is focused on the web content on the web pad—the user has the choice of pausing the TV show or not). In order to reduce the price of the web pad, the storage capacity of the set top device may be used to store the retrieved web pages.

In this embodiment, the user is able to pause the TV content while viewing the web content on the web pad, and choose whether the web content goes to the web pad, to the TV screen, or to both. In last two cases, the web pad user input (touch screen button clicks, etc.) may be reflected in the information shown on the display. In these cases, display 22 may be treated as a slave video output for the web pad.

The use of a web pad in the system presents at least one additional problem. The bandwidth of the web pad device (that is operating over a limited-bandwidth RF connection) may not be high enough to render video streams coming off a high-speed Internet connection. By integrating the TV functionality with the web pad, however, streaming web content may be viewed on display 22.

In another embodiment of the invention, a URL associated with a TV show points to a web site with streaming video content on it. The user may browse to that site using the web pad, while the user is watching a TV show (and the TV show is being rendered on the display, because the user has not chosen to pause it). When the user discovers that the web site associated with this URL has streaming web content to watch, the user may push TV pause button 84 on the web pad to cause the set top device 10 to pause/record the TV content and show the streaming web content on the display 22. The user may now watch/hear the streaming web content on the display (instead of the web pad). The web pad at this point may only display a dark box at the location of the video (since the RF connection speed may be too slow to ship the streaming web content to the pad).

One difference between this embodiment and other embodiments described above is the use of multiple independent screens for the display of web content and the coordination of the control/display of TV content and web content across these multiple screens. One of the features that a web pad enables is that it will typically include a touch screen for user input. If the web content is displayed on display 22 instead of web display 82, the touch screen of the web pad may be used to control a cursor on the display. This will have advantages over the cursor motion buttons (up, down, left, right) typically found on a TV remote control. For example, many web sites use precise pixel coordinates of the mouse events for sophisticated user interfaces. To implement this feature, a protocol may be used between the browser program operating on the web pad and the browser operating in the set top device to communicate user interface events to the set top browser. The coordinate system of the pad's browser may be transformed to that of the display by scaling based on pixel dimensions of the respective screens. The transformation may be done in the set top device's browser to minimize the complexity of the web pad, which may more limited processing capabilities.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the set top device 10 includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 3, however, other systems may also be used and not all components of the system shown are required for the present invention. Sample system 400 may be used, for example, to execute the processing for embodiments of a method for integrating broadcast television pause and web browsing, in accordance with the present invention, such as the embodiment described herein. Sample system 400 is representative of processing systems based on the PENTIUM®II, PENTIUM® III, and CELERON™ microprocessors available from Intel Corporation, although other systems (including personal computers (PCs) having other microprocessors, engineering workstations, other set-top boxes and the like) and architectures may also be used. In one embodiment, sample system 400 may be executing a version of the WINDOWS® operating system available from Microsoft Corporation, although other operating systems and graphical user interfaces, for example, may also be used.

FIG. 3 is a block diagram of a system 400 of one embodiment of the present invention. The set top device of FIG. 1 may be implemented in one embodiment as system 400 of FIG. 3. The system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 3 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 3) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a remote control, mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to integrate broadcast television pause and web browsing. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to integrate broadcast television pause and web browsing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of integrating broadcast television pause and web browsing in accordance with the present invention, whereas memory 406 is used to store on a shorter term basis the executable instructions of embodiments of the methods for integrating broadcast television pause and web browsing in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of coordinating the display of an incoming signal stream on a display with web browsing comprising:
   storing a uniform resource locator (URL) associated with the incoming signal stream being displayed;
   receiving a first signal to display web content associated with the URL;
   pausing display of the incoming signal stream;
   automatically determining whether to store the incoming signal stream on a storage device based on at least one of a user's viewing history, a user's recording history, and a predetermined amount of time displaying a current program of the incoming signal stream, when the first signal is received;
   storing the incoming signal stream on a storage device after pausing, when it is determined that the incoming signal stream is to be stored; and
   obtaining and displaying the web content associated with the URL.

2. The method of claim 1, further comprising:
   receiving a second signal to resume display of the incoming signal stream;
   removing the web content from the display; and
   resuming display of the incoming signal stream at the point that the pause occurred by obtaining the incoming signal stream from the storage device.

3. The method of claim 1, wherein displaying the web content comprises displaying the web content on the entire display.

4. The method of claim 2, further comprising receiving another first signal and obtaining and displaying a web page linked to the web content.

5. The method of claim 4, further comprising receiving another second signal to return to the display of previously displayed web content.

6. The method of claim 4, further comprising receiving a third signal to return directly to display of the incoming signal stream at the point that the pause occurred by obtaining the incoming signal stream from the storage device.

7. The method of claim 1, wherein the incoming signal stream comprises broadcast TV content.

8. The method of claim 1, wherein the incoming signal stream comprises streaming web content.

9. The method of claim 1, further comprising providing a visual cue on the display to a user when a URL associated with the incoming signal stream has been stored.

10. The method of claim 1, wherein the stored URL may be used for obtaining web content only for a predetermined period of time.

11. The method of claim 1, further comprising obtaining and displaying web content associated with any URL specified by a user.

12. An article comprising: a machine readable medium having a plurality of machine readable instructions, wherein when the instructions are executed by a processor, the instructions coordinate the display of an incoming signal stream on a display with web browsing by:
   storing a uniform resource locator (URL) associated with the incoming signal stream being displayed;
   receiving a first signal to display web content associated with the URL;
   pausing display of the incoming signal stream;
   automatically determining whether to store the incoming signal stream on a storage device based on at least one of a user's viewing history, a user's recording history, and a predetermined amount of time displaying a current program of the incoming signal stream, when the first signal is received;
   storing the incoming signal stream on a storage device after pausing, when it is determined that the incoming signal stream is to be stored; and
   obtaining and displaying the web content associated with the URL.

13. The article of claim 12, further comprising instructions for:
   receiving a second signal to resume display of the incoming signal stream;
   removing the web content from the display; and
   resuming display of the incoming signal stream at the point that the pause occurred by obtaining the incoming signal stream from the storage device.

14. The article of claim 12, wherein instructions for displaying the web content comprise instructions for displaying the web content on the entire display.

15. The article of claim 12, further comprising instructions for receiving another first signal and obtaining and displaying a web page linked to the web content.

16. The article of claim 15, further comprising instructions for receiving another second signal to return to the display of previously displayed web content.

17. The article of claim 15, further comprising instructions for receiving a third signal to return directly to display of the incoming signal stream at the point that the pause occurred by obtaining the incoming signal stream from the storage device.

18. The article of claim 12, further comprising instructions for providing a visual cue on the display to a user when a URL associated with the incoming signal stream has been stored.

19. The article of claim 12, further comprising instructions for obtaining and displaying web content associated with any URL specified by a user.

20. An apparatus for coordinating the display of an incoming signal stream with web browsing comprising:
   a storage device to store the incoming signal stream and a uniform resource locator (URL) associated with the incoming signal stream;
   a processor coupled to the storage device, the processor executing instructions for receiving a first signal to display web content associated with the URL, pausing display of the incoming signal stream, automatically determining whether to store the incoming signal stream on the storage device based on at least one of a user's viewing history, a user's recording history, and a predetermined amount of time displaying a current program of the incoming signal stream, when the first signal is received, storing the incoming signal stream on the storage device after pausing, when it is determined that the incoming signal stream is to be stored, and obtaining and displaying the web content associated with the URL.

21. The apparatus of claim 20, wherein the processor executes further instructions for receiving a second signal to resume display of the incoming signal stream, removing the web content from the display, and resuming display of the incoming signal stream at the point that the pause occurred by obtaining the incoming signal stream from the storage device.

22. The apparatus of claim 21, further comprising a remote control device for communicating with the processor, the remote control device having a first button for initiating the sending of the first signal to the processor, and a second button for initiating the sending of the second signal to the processor.

23. The apparatus of claim 22, wherein the remote control device further comprises a third button to initiate the sending of a third signal to the processor to cause the resumption of the display of the incoming signal stream at the point that the pause occurred.

24. The apparatus of claim 21, wherein the incoming signal stream comprises broadcast TV content.

25. The apparatus of claim 21, wherein the incoming signal stream comprises streaming web content.

26. A system for coordinating the display of an incoming signal stream with web browsing comprising:
   a set top device, the set top device having a storage device to store the incoming signal stream and a uniform resource locator (URL) associated with the incoming signal stream, and a processor coupled to the storage device, the processor executing instructions for receiving a first signal to display web content associated with the URL, pausing display of the incoming signal stream, automatically determining whether to store the incoming signal stream on the storage device based on at least one of a user's viewing history, a user's recording history, and a predetermined amount of time displaying a current program of the incoming signal stream, when the first signal is received, storing the incoming signal stream on the storage device after pausing, when it is determined that the incoming signal stream is to be stored, and obtaining and forwarding the web content associated with the URL; and
   a hand held portable computing appliance communicatively coupled to the set top device, the appliance having a first display for displaying the web content received from the set top device, and a first user input indicator for causing the sending of the first signal.

27. The system of claim 26, further comprising a second display coupled to the set top device to display at least one of the incoming signal stream and the web content, and wherein the appliance selects one or more of the displays to receive the web content.

28. The system of claim 27, wherein the web content comprises streaming web content and the appliance selects the second display to show the streaming web content.

29. The system of claim 27, wherein the appliance further comprises a cursor control mechanism for receiving user input data to control a cursor shown on the second display.

30. A system for coordinating the display of an incoming signal stream with web browsing comprising:
   a set top device, the set top device having a storage device to store the incoming signal stream and a uniform resource locator (URL) associated with the incoming signal stream, and a processor coupled to the storage device, the processor executing instructions for receiving a first signal to display web content associated with the URL, pausing display of the incoming signal stream, automatically determining whether to store the incoming signal stream on the storage device based on at least one of a user's viewing history, a user's recording history, and a predetermined amount of time displaying a current program of the incoming signal stream, when the first signal is received, and storing the incoming signal stream on the storage device after pausing, when it is determined that the incoming signal stream is to be stored; and
   a hand held portable computing appliance communicatively coupled to the set top device, the appliance having a first display for displaying the web content associated with the URL, and a first user input indicator for causing the sending of the first signal.

31. The system of claim 30, wherein the web content associated with the URL is received by the appliance from the set top device.

32. The system of claim 30, wherein the web content associated with the URL is received by the appliance from a cellular telephone/modem connection to the Internet.

33. The system of claim 30, wherein the web content associated with the URL is received by the appliance from a radio frequency (RF) based home network coupled to the Internet.

* * * * *